July 5, 1927.  L. E. LA BRIE  1,634,367

BRAKE

Filed Aug. 12 1925  2 Sheets-Sheet 1

INVENTOR
LUDGER E. LA BRIE
BY M. W. McConkey
ATTORNEY

July 5, 1927.

L. E. LA BRIE

BRAKE

Filed Aug. 12, 1925

INVENTOR
LUDGER E. LA BRIE
BY
M. W. McConkey
ATTORNEY

Patented July 5, 1927.

1,634,367

UNITED STATES PATENT OFFICE.

LUDGER ELIZE LA BRIE, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed August 12, 1925. Serial No. 49,737.

This invention relates to brakes, and is illustrated as embodied in a "double-wrapping" or "duo-servo" brake for an automobile.

An object of the invention is to provide a novel floating expansion joint between the brake shoes, preferably adjustable from outside the backing plate, and shown as including novel wedge members operated by a right-and-left threaded adjusting member. While it may be used without the above adjustment, I prefer to combine with it a novel wedge and spring device for centering the shoes in their initial idle position when the brake is released.

Other objects and features of the invention, including a novel device for yieldingly positioning the floating shoes laterally, and other novel combinations of parts and desirable particular constructions, will be apparent from the following description of the illustrative embodiments shown in the accompanying drawings, in which.

Figure 1:
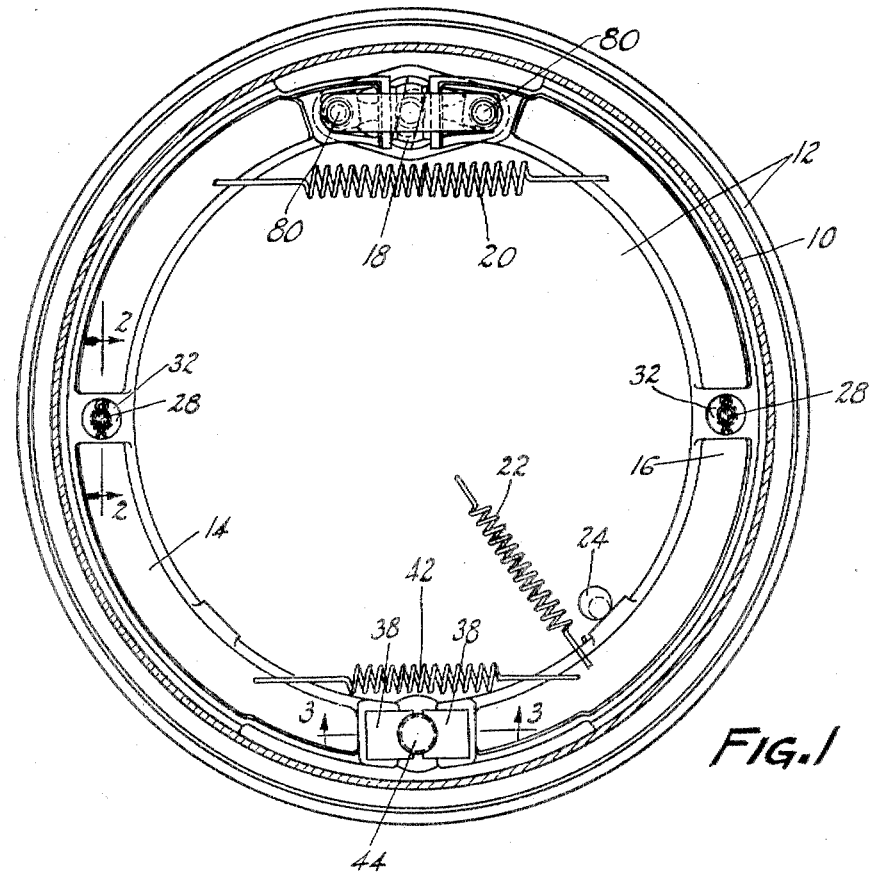
Fig. 1 is a vertical section through the brake just inside the wheel, showing the shoes in side elevation.
Figure 2:
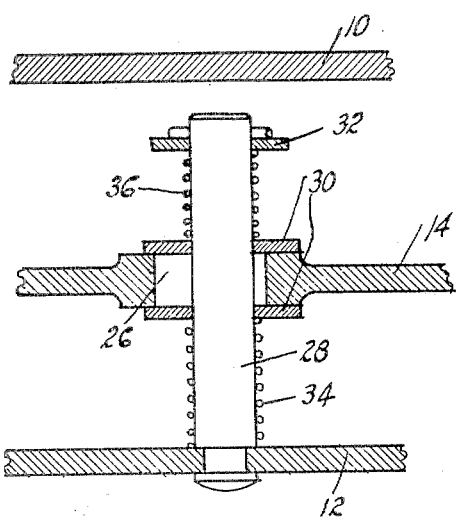
Fig. 2 is a section on the line 2—2 of Fig. 1, showing one of the novel devices for positioning the floating shoes laterally.

The brake shown is of the "double-wrapping" or "duo-servo" type,—i. e. the friction device anchors at one end when the drum is turning in one direction and at the other end when the drum is turning in the other direction. The drum is shown at 10 and the backing plate at 12, while housed between them is a friction device shown as a pair of interchangeable connected floating shoes 14 and 16. The shoes are expanded to apply the brake by means such as a floating cam 18, against the resistance of a return spring 20. If desired, an auxiliary spring 22 and an eccentric stop 24 may be provided to determine the idle positions of the shoes.

Each shoe is formed wtih a relatively large opening 26, giving plenty of clearance for a pin 28 carried by plate 12 approximately at the center of the shoe. Washers 30 engaging opposite sides of the shoe co-operate respectively with plate 12 and with a third washer 32 in confining compressed coil springs 34 and 36, which thus serve yieldingly to position the shoe laterally without interfering with its circumferential movement.

Figure 3:
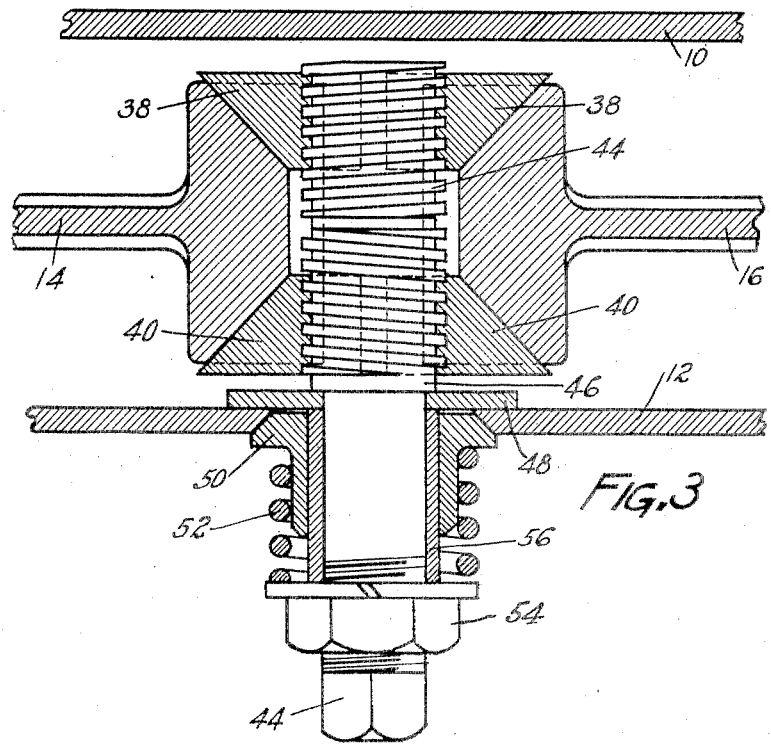
Fig. 3 is a section on the line 3—3 of Fig. 1, showing the novel expansible joint and centering means.

The bottom ends of shoes 14 and 16 are formed with oppositely-inclined wedge surfaces engaged by wedge adjusting members, made for convenience in pairs 38 and 40, all four being identical and interchangeable. Shoes 14 and 16 are held against members 38 and 40 by a spring 42, the whole constituting a floating adjustable joint. In Fig. 3, members 38 and 40 are directly threaded on a right-and-left threaded member 44 projecting through a relatively large opening in plate 12, so that it may be turned from outside the brake to expand the novel floating joint to take up for wear of the shoes.

Member 44 is formed with a collar 46 holding a washer 48 slidably engaging the inside of plate 12. The edges of the opening in plate 12 are beveled to form a conical wedge surface engaged by a conical surface on a movable wedge member 50 sleeved on member 44. A spring 52 confined between the movable wedge member 50 and a washer and nut 54 on member 44, is tensioned by movement of member 50, when shoes 14 and 16 shift circumferentially in either direction to urge the shoes back toward their initial idle central position. The tension of spring 52 may be adjusted by nut 54; if desired, a limit to the tension of the spring by the nut may be fixed by a spacer or bushing 56.

Figure 4:
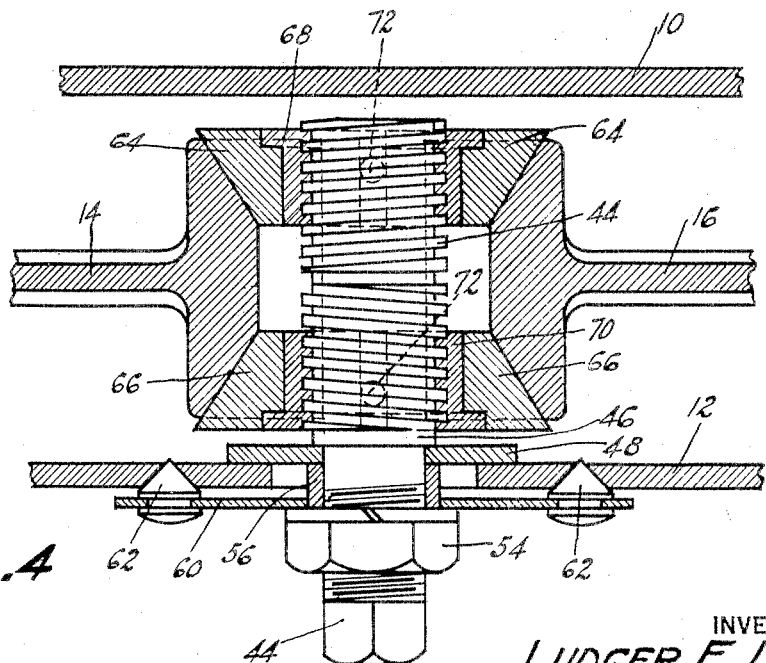
Fig. 4 is a view corresponding to Fig. 3, but showing a modification.

In the arrangement of Fig. 4, spring 52 is replaced by a leaf spring 60 sleeved on member 44, and tensioned more or less by nut 54 up to a limit set by spacer 56. Spring 60 carries two or more conical wedge lugs 62 seated in conical seats in plate 12. In this modification, wedge members 64 and 66, corresponding to members 38 and 40, are not themselves threaded, but are recessed to receive threaded flanged bushings 68 and 70, which may be held from turning by laterally-projecting pins 72, pin 72 for bushing 68 being embraced between members 64, and the other pin 72 between members 66.

The braking torque is taken, according to the direction of rotation of the drum, by one or the other of two posts 80 projecting through slots in the shoes.

Figure 5:
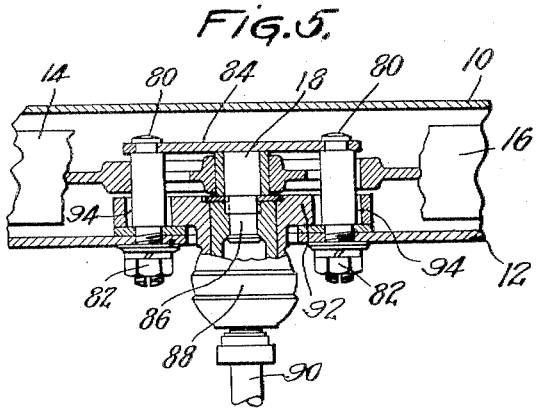
Fig. 5 is a section on the line 5—5 of Fig. 1, showing the cam mounting.

In Fig. 5 is shown one desirable mounting for a floating cam such as the cam 19. In this arrangement (in which shoe 14 is shown anchored, with the brake applied), posts 80 are fixedly secured to the backing plate 12, as by nuts 82, and carry a plate 84 crossing the ends of the shoes and confining them laterally. Cam 18 is mounted on a shaft 86, which may be connected by a universal joint in a housing 88 to an operating shaft 90. (See Patent No. 1,604,394, granted Bendix Brake Company October 26, 1926, on an application of A. Y. Dodge.)

Shaft 86 of cam 18 is journalled in a bracket 92 having openings 94 for posts 80, so that it may float to allow one or the other of the shoes to anchor.

While two illustrative embodiments have been described in detail, it is not my intention to limit its scope to those particular embodiments, or otherwise than by the terms of the appended claims.

I claim:

1. A brake comprising, in combination, a drum, a backing plate, shoes between the drum and backing plate, a floating joint between the shoes, and means floating with the joint and operable from outside the backing plate for expanding the joint to take up for wear in the shoes.

2. A brake comprising, in combination, a drum, a backing plate, shoes between the drum and backing plate, a floating joint between the shoes, means operable from outside the backing plate for expanding the joint to take up for wear in the shoes, and means acting on the joint yieldingly to urge it toward a central idle position.

3. A brake comprising, in combination, a drum, a backing plate, shoes between the drum and backing plate, a floating joint between the shoes, means operable from outside the backing plate for expanding the joint to take up for wear in the shoes, and wedging means and a spring tensioned thereby when the brake is applied and urging the joint toward a central idle position when the brake is released.

4. A brake comprising, in combination, a drum, shoes within the drum, wedging members engaging adjacent ends of the shoes, and a right-and-left threaded member for operating the wedging members to take up for wear of the shoes, the wedging members and threaded member constituting a circumferentially-movable floating joint between the shoes.

5. A brake comprising, in combination, a drum, shoes within the drum shiftable in one direction or the other according to the direction the drum is turning, wedging members engaging adjacent ends of the shoes, a right-and-left threaded member for operating the wedging member to take up for wear of the shoes, the wedging members and threaded member constituting a circumferentially-movable floating joint between the shoes, and means for taking braking torque from the other ends of the shoes in either direction of drum rotation.

6. A brake comprising, in combination, a drum, shoes within the drum, wedging members engaging adjacent ends of the shoes, a right-and-left threaded member for operating the wedging members to take up for wear of the shoes, the wedging members and threaded member constituting a circumferentially-movable floating joint between the shoes, and spring means acting on the floating joint to center the shoes in idle position.

7. A brake comprising, in combination, a drum, shoes within the drum, wedging members engaging adjacent ends of the shoes, a right-and-left threaded member for operating the wedging members to take up for wear of the shoes, the wedging members and threaded member constituting a circumferentially-movable floating joint between the shoes, and spring wedging means acting on the floating joint to center the shoes in idle position.

8. A brake having shoes and comprising, in combination with said shoes, a pair of oppositely-arranged wedges engaging adjacent ends of the shoes, a right-and-left threaded member for operating the wedges to take up for wear of the shoes, a stationary wedge member, a movable wedge member sleeved on the threaded member in engagement with the stationary wedge member, and a spring urging the movable wedge member toward the stationary wedge member and tensioned by said members when the shoes move to urge the shoes back toward idle position.

9. A brake having shoes and comprising, in combination with said shoes, a pair of oppositely-arranged wedges engaging adjacent ends of the shoes, a right-and-left threaded member for operating the wedges to take up for wear of the shoes, a stationary wedge member, a movable wedge member sleeved on the threaded member in engagement with the stationary wedge member, a spring urging the movable wedge member toward the stationary wedge member and tensioned by said members when the shoes move to urge the shoes back toward idle position, and means for adjusting the tension of the spring.

10. A brake having, in combination, a friction device, an adjacent wedge member held against movement circumferentially of the brake, a wedge member movably carried by the friction device in engagement with the first wedge member, a spring urging the two wedge members together and tensioned by said members when the friction device moves, in such a manner as to urge the friction device back toward its initial position and means engaging the ends of the friction device for taking braking torque separately from said wedge members.

11. A brake having, in combination, a friction device, an adjacent member having oppositely-inclined wedge surfaces, a member movably carried by the friction device in engagement with the first wedge member and having correspondingly-inclined wedge surfaces, a spring urging the movable wedge member against the stationary wedge member and tensioned by said members when the friction device moves in either direction, in such a manner as to urge the friction device back toward its initial central position, and means engaging the ends of the friction device for taking braking torque separately from said wedge members.

12. A brake comprising, in combination, a drum, a plurality of connected shoes within the drum and arranged to wrap against the drum in either direction of drum rotation, there being an enlarged opening through each shoe near its center, a stationary pin passing through each opening with a considerable clearance allowing free circumferential movement of the shoe, a pair of compressed springs sleeved on each pin on opposite sides of its shoe and yieldingly positioning the shoe laterally, applying means positioning laterally two of the ends of the shoes, and connecting means positioning laterly the other two ends of the shoes.

13. A brake comprising, in combination, shoes having oppositely-inclined wedge surfaces at adjacent ends, two pairs of opposite wedge members having surfaces engaging the oppositely-inclined surfaces, and a right-and-left threaded member for adjusting the four wedge members simultaneously.

14. A brake comprising, in combination, shoes having oppositely-inclined wedge surfaces at adjacent ends, two pairs of opposite wedge members having surfaces engaging the oppositely-inclined surfaces, a right-and-left threaded member for adjusting the four wedge members simultaneously, and a pair of bushings threaded on the adjusting member and each operating one pair of wedge members.

15. A brake comprising, in combination, shoes having oppositely-inclined wedge surfaces at adjacent ends, two pairs of opposite wedge members having surfaces engaging the oppositely-inclined surfaces, a right-and-left threaded member for adjusting the four wedge members simultaneously, a pair of bushings threaded on the adjusting member and each operating one pair of wedge members, and a pin carried by each bushing and projecting between its wedge members to prevent the bushings from turning.

16. A brake comprising, in combination, a stationary part having wedge surfaces, a double-wrapping friction device, a leaf spring carried by the friction device, and wedge parts carried by the leaf spring and seating against the stationary wedge surfaces, movement of the friction device in either direction operating the wedge parts to tension the leaf spring to urge the friction device yieldingly back toward its initial central idle position.

17. A brake comprising, in combination, a stationary part having conical seats, a double-wrapping friction device, a leaf spring carried by the friction device, and conical lugs carried by the leaf spring and seating in the stationary seats, movement of the friction device in either direction operating the lugs to tension the leaf spring to urge the friction device yieldingly back toward its initial central idle position.

18. A brake comprising, in combination, a drum, a friction device including a plurality of shoes within the drum shiftable to anchor at one shoe when the drum is turning in one direction and on a different shoe when the drum is turning in the other direction, a floating joint connecting the shoes which is adjustable to take up for wear, and means yieldingly acting on the adjustable joint to center the friction device when the brake is released.

19. A brake comprising, in combination, a drum, a friction device including a plurality of shoes within the drum shiftable to anchor at one shoe when the drum is turning in one direction and on a different shoe when the drum is turning in the other direction, a floating expansible joint connecting the shoes which includes wedges adjustable to take up for wear, and means yieldingly acting on the adjustable joint to center the friction device when the brake is released.

20. A brake comprising, in combination, a drum, shoes engageable with the drum having conical surfaces in their adjacent ends, a member passing between said ends parallel to the axis of the drum and which is free to float with the shoes, and conical wedges seated against said surfaces and operated by said member and forming with said member a floating expansion joint pivotally connecting the shoes.

21. A brake comprising, in combination, a drum, shoes engageable with the drum and having adjacent ends, a member passing between said ends parallel to the axis of the drum and which is free to float with the shoes, and wedging means acting on the shoe ends and operated by said member and forming with said member a floating expansion joint pivotally connecting the shoes.

22. A brake comprising, in combination, a drum, shoes engageable with the drum and having adjacent ends, a member passing between said ends parallel to the axis of the drum and which is free to float with the shoes, wedging means acting on the shoe ends and operated by said member and forming with said member a floating expansion joint pivotally connecting the shoes, and means for taking braking torque which is engaged by one shoe when the drum is turning in one direction and by the other shoe when the drum is turning in the other direction.

23. A brake comprising, in combination, a drum, a plurality of shoes within the drum, means for taking the braking torque of all of said shoes from one shoe when the drum is turning in one direction and from a different shoe when the drum is turning in the other direction, a floating joint connecting the shoes, and wedging means acting on said joint to center the shoes when the brake is released.

24. A brake comprising, in combination, a drum, a plurality of shoes within the drum, means for taking the braking torque of all of said shoes from one shoe when the drum is turning in one direction and from a different shoe when the drum is turning in the other direction, a floating joint connecting the shoes, and wedging centering means including a wedge member shifting with the joint in one direction or the other when the brake is applied and another wedge member engaged thereby and a spring tensioned by relative movement of said wedge members.

25. A brake comprising, in combination, a drum, a plurality of shoes within the drum, means for taking the braking torque of all of said shoes from one shoe when the drum is turning in one direction and from a different shoe when the drum is turning in the other direction, a floating joint connecting the shoes, and wedging centering means including a part shifting with the joint in one direction or the other when the brake is applied and a member wedgingly engaged thereby and a spring tensioned by relative movement of said part and said member.

26. A brake comprising, in combination, a drum, shoes engageable with the drum, means pivotally connecting the shoes and floating with the shoes, said means including a part projecting laterally from between the shoes, and wedging means acting yieldingly on said projecting part to center the shoes when the brake is released.

27. A brake comprising, in combination, a drum, shoes engageable with the drum, means pivotally connecting the shoes and floating with the shoes, said means including a part extending between the ends of the shoes parallel to the axis of the drum, and wedging means acting yieldingly on said part to center the shoes when the brake is released.

In testimony whereof I have hereunto signed my name.

LUDGER ELIZE LA BRIE.